Patented Feb. 20, 1945

2,369,667

UNITED STATES PATENT OFFICE 2,369,667

SULPHUR DYESTUFFS AND PROCESS OF PREPARING THE SAME

Arthur Lawrence Fox, Woodstown, N. J., assignor to E. I. du Pont de Nemours & Company, Wilmington, Del., a corporation of Delaware No Drawing. Application November 21, 1942, Serial No. 466,482

5 Claims. (Cl. 260—139)

This invention relates to novel sulphur colors which are prepared by the action of an aluminum - chloride - sulphur - monochloride complex upon carbocyclic hydrocarbons and their substitution derivatives. More particularly, this invention deals with novel coloring matters having the properties of sulphur dyestuffs and being obtainable by reacting with an aluminum-chloride-sulphur-monochloride complex of the constitution $AlCl_3.2S_2Cl_2$ upon polycyclic aromatic compounds.

It is an object of this invention to provide a new and economical method for the production of sulphur colors. It is a further object of this invention to provide sulphur colors not now known. It is a further object of this invention to convert polycyclic aromatic compounds into insoluble dye pigments which may be applied to cotton fiber from a sodium sulfide vat. Other and further important objects of this invention will appear as the description proceeds.

In the past, sulphur colors have been prepared in general by reacting dye intermediates with sodium polysulphide over extremely long periods of time, e. g., 10 to 150 hours. Other methods employed have included high temperature fusions with sulphur or sulphides, but these methods have been destructive to the organic molecules involved.

By this invention there is provided a convenient, quick and economical method for preparing sulphur colors by treating polyclclic aromatic compounds with a complex of sulphur chloride and aluminum chloride which is easily and cheaply prepared and which is extremely reactive. By this invention it is simply necessary to treat the organic molecule with this reagent for relatively short periods of time, depending on the activity of the molecule, and drown the reaction mass. It has been found in many cases that a reaction period of 5 minutes is ample, although longer reaction periods often produce deeper shades of the dye and introduce greater amounts of sulphur into the molecule.

It is worthy of note that treatment of organic compounds with sulphur monochloride in the presence of aluminum chloride as a catalyst has been done on various occasions in the art. However, these treatments did not result in the same products or mixtures of products as are obtainable according to this invention. The products from said older procedures were not dyestuffs, and their chlorine content was generally much larger than in the reaction products of this invention.

The distinctive feature of my present invention is that instead of using a mixture of sulphur monochloride and aluminum chloride, I employ a complex addition product of these two reagents carefully prepared in advance, as by heating the two reagents together in suitable proportions by weight. One of the commonest addition products thus obtained is a complex of constitution $AlCl_3.2S_2Cl_2$ whose specific gravity referred to water is 1.784 (Ruff and Golla, Zeit. f. anorg. u. algem. Chemie, vol. 138, pages 17–32; Zentralblatt, 1924, II, 1570). However, an excess of sulphur monochloride may be employed with the above complex, with the result that the reaction product may contain a larger proportion of chlorine, but is otherwise of the same general nature as in the preferred embodiments of this invention.

The characteristic of the novel compounds obtained according to this invention is that they are colored bodies of the sulphur dyestuff class. In other words, they may be reduced with aqueous sodium sulphide to produce a "sulphur dye vat," which has affinity for textile fiber, and which may be oxidized on the fiber into dyeings of good fastness qualities.

The crude reaction products of this invention are isolated by drowning the reaction mass in water or on ice and may be purified by extraction with dilute alkali. This dissolves the aluminum as sodium aluminate and converts any precipitate of sulphur to sodium sulphide or sodium sulphhydrate. It has been found that many of the sulphur colors made by this procedure are so easily vattable with sodium sulphide that the sodium sulphide produced in the action of the sodium hydroxide on the sulphur in the drowned crude product causes the colors to vat; consequently, in some cases, it is necessary to isolate the sulphur color by an oxidative procedure, such as blowing with air or treatment with an oxidizing agent. However, many of the other dyes formed are not vatted by the low concentration of sodium sulphide formed in the extraction and may be isolated directly by filtration. For the purpose of analysis, the crude materials purified by extraction with caustic may be further extracted with carbon disulphide to remove any free sulphur.

As already indicated, the dyes made according to this invention may be converted into soluble leuco derivatives by heating with sodium sulphide solutions. It has been found advisable in many cases to vat the dye by heating the dry material with sodium sulphide melted in its own water of crystallization. This concentrated solution easily vats the dye and on dilution completely soluble leuco vats are obtained. These may be employed to dye cotton and rayon. In other cases wool, silk, and nylon have been dyed, but due to the alkalinity of the vat, great care must be exercised not to destroy the fiber.

The following examples are given to illustrate this invention, without any intent however to limit my invention to the details of procedure. Parts mentioned are by weight.

Part A—Preparation of the aluminum-chloride-sulphur-chloride complex.

1975 parts aluminum chloride (AlCl₃) and 4215 parts of sulphur monochloride (S₂Cl₂) were mixed and heated at 90–95° C. for 36 hours. The reaction mass on cooling was a dark brown liquid comprising the sulphur chloride-aluminum chloride complex.

Part B—Preparation of novel sulphur colors.

Example 1

20 parts of acenaphthene were added slowly over a 20-minute period to 100 parts of the aluminum-chloride-sulphur-monochloride complex prepared above and maintained at 15° C. by external cooling. After the addition was complete, the mass was agitated for 15 minutes at 25° C., drowned on ice and concenrated hydrochloric acid, and the brown dye was filtered off and washed with 1% sodium hydroxide and then with water. It dyed cotton from a sodium sulphide bath a pastel shade of brown.

Example 2

20 parts of acenaphthene were suspended in 500 parts of carbon tetrachloride, and to this were added slowly, over a period of 30 minutes, 140 parts of the above mentioned aluminum-chloride-sulphur-monochloride complex while agitating the reaction mass. The mixture was then heated to 75° C. for one hour, and water was then added slowly. The brown solid was filtered off and washed well with warm water. It dyed cotton a rich chocolate brown from a sodium sulphide vat.

Example 3

20 parts of perylene were reacted with 120 parts of the above aluminum-chloride-sulphur-monochloride complex at 110° C. for one hour. This reaction introduced 4.5 sulphur atoms and gave a product dyeing cotton from a sodium sulphide bath a full brown shade.

Example 4

20 parts of pyrene were reacted with 120 parts of the aluminum-chloride-sulphur-monochloride complex for 30 minutes at 170° C. This introduced 5 atoms of sulphur and gave a product which dyed cotton a pink shade from a sodium sulphide bath.

Example 5

20 parts of phenanthrene were reacted with 120 parts of the above aluminum-chloride-sulphur-monochloride complex at 110° C. for one hour. This introduced 5 atoms of sulphur and gave a product which dyed cotton an olive shade from a sodium sulphide bath.

Example 6

20 parts retene were reacted with 120 parts of the sulphur-monochloride-aluminum-chloride complex for one hour at 25° C. and gave a product which dyed cotton a light tan shade from a sodium sulphide bath.

Example 7

20 parts of fluorene were reacted with 120 parts of the sulphur-monochloride-aluminum-chloride complex at 110° C. for 30 minutes. This reaction introduced 7 atoms of sulphur and gave a product dyeing cotton from a sodium sulphide bath an olive brown shade.

Example 8

20 parts of polybenzyl were reacted with 120 parts of the above sulphur-monochloride-aluminum-chloride complex at 110° C. for 4.5 hours. The product contained 3 atoms of sulphur and dyed cotton a clear gray.

Example 9

20 parts of Nancy gum rosin were reacted with 120 parts of the aluminum-chloride-sulphur-monochloride complex for 2 hours at 110° C. The product dyed cotton from a sodium sulphide bath a clear tan.

It will be understood that the above examples are merely illustrative, and that wide variation in details of procedure may be practiced without departing from the spirit of this invention. In my copending application of even date, Serial No. 466,481, I have discussed at length miscellaneous permissible variations as to use of diluents, use of excess reagents of the sulphur-monochloride class or of the aluminum chloride class, optimum temperature, duration of the reaction, substituents in the initial organic material to be sulphurized, and other details. All these variations may be practiced with the invention set forth in the instant application.

I claim as my invention:

1. The process of preparing a sulphur type dyestuff, which comprises reacting a polycyclic aromatic hydrocarbon with the complex compound obtainable by heating aluminum chloride with substantially two moles of sulphur monochloride at elevated temperature and in the absence of a solvent.

2. The process of preparing a sulphur type dyestuff, which comprises reacting acenaphthene with the aluminum-chloride-sulphur-monochloride complex represented by the formula $$AlCl_3.2S_2Cl_2$$

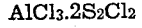

and treating the reaction mass at low temperature with dilute alkali to isolate the color.

3. The sulphur-containing compounds obtainable by reacting with the complex addition product of aluminum chloride and sulphur monochloride having the constitution $AlCl_3.2S_2Cl_2$ upon polycyclic aromatic hydrocarbons, said compounds being colored bodies, soluble in aqueous sodium sulphide solution and being capable of dyeing cotton from said solution by the standard sulphur-vat dye process.

4. As a new dyestuff, the reaction product of an aluminum - chloride - sulphur - monochloride complex of constitution $AlCl_3.2S_2Cl_2$ upon an aromatic hydrocarbon having at least three carbocyclic rings, said dyestuff being soluble in the sodium sulphide vat and being capable of dyeing cotton therefrom by the sulphur-vat dye process.

5. The coloring matter obtainable by reacting acenaphthene with an aluminum-chloride-sulphur-monochloride complex of the formula $AlCl_3.2S_2Cl_2$, said coloring matter being characterized by its capacity of dyeing textile material by the sulphur-vat process.

ARTHUR LAWRENCE FOX.